(12) United States Patent
Molto et al.

(10) Patent No.: US 7,241,035 B2
(45) Date of Patent: Jul. 10, 2007

(54) LIGHTING APPARATUS HAVING MEANS FOR COMPENSATING FOR FAILURE OF LIGHTING ON A BEND

(75) Inventors: Valerie Molto, Bobigny (FR); Eric Blusseau, Bobigny (FR); Pierre Albou, Bobigny (FR)

(73) Assignee: Valeo Vision, Bobigny, Cedex (FR)

( * ) Notice: Subject to any disclaimer, the term of this patent is extended or adjusted under 35 U.S.C. 154(b) by 60 days.

(21) Appl. No.: 10/766,996

(22) Filed: Jan. 28, 2004

(65) Prior Publication Data
US 2004/0184279 A1    Sep. 23, 2004

(30) Foreign Application Priority Data
Jan. 31, 2003    (FR) ..................... 03 01281

(51) Int. Cl.
*B60Q 1/06*    (2006.01)
(52) U.S. Cl. .................. 362/466; 362/467; 362/465
(58) Field of Classification Search ............... 362/37, 362/39–41, 43–44, 227, 235, 242, 244, 459–460, 362/464–468, 469, 523–532, 240, 250, 269, 362/272, 286, 287, 418, 427, 428; 701/49–56; 307/9.1, 10.1, 10.8; 315/76–77, 80–82
See application file for complete search history.

(56) References Cited

U.S. PATENT DOCUMENTS

| 3,614,416 | A | * | 10/1971 | Fleury | 362/469 |
|---|---|---|---|---|---|
| 3,643,082 | A | * | 2/1972 | Fleury | 362/468 |
| 3,737,653 | A | * | 6/1973 | Biggs et al. | 362/308 |
| 5,436,807 | A | * | 7/1995 | Kobayashi | 362/41 |
| 5,459,646 | A | * | 10/1995 | Sato | 362/460 |
| 5,833,345 | A | * | 11/1998 | Ito | 362/507 |
| 5,868,488 | A | * | 2/1999 | Speak et al. | 362/37 |
| 6,305,823 | B1 | * | 10/2001 | Toda et al. | 362/276 |
| 6,623,147 | B2 | * | 9/2003 | Hayami et al. | 362/467 |
| 6,761,473 | B2 | * | 7/2004 | Hayami | 362/466 |
| 2002/0057573 | A1 | * | 5/2002 | Kondo et al. | 362/465 |
| 2002/0163814 | A1 | * | 11/2002 | Hayami et al. | 362/466 |
| 2002/0196634 | A1 | * | 12/2002 | Jeannot | 362/464 |

FOREIGN PATENT DOCUMENTS

| EP | 1260761 | 11/2002 |
|---|---|---|
| FR | 2769071 | 4/1999 |
| FR | 2786448 | 6/2000 |
| FR | 2797824 | 3/2001 |
| FR | 2822425 | 9/2002 |

* cited by examiner

*Primary Examiner*—Sandra O'Shea
*Assistant Examiner*—Bao Q. Truong
(74) *Attorney, Agent, or Firm*—Morgan & Finnegan, LLP

(57) ABSTRACT

This invention proposes lighting apparatus, for a vehicle having two passing lights for producing a passing beam, which are adapted to pivot to a position deflected to the left or to the right when the vehicle is on a left-hand bend or a right-hand bend, respectively, together with two auxiliary headlights for giving an auxiliary regulation light beam. The apparatus also includes a central unit which, when it detects failure of a passing light in its deflected position, causes the faulty passing light to be extinguished and at least one auxiliary headlight to be lit, so that the auxiliary headlight compensates for the extinction of the faulty passing light, by producing a compensating light beam which has regard to the maximum permitted regulation photometric values above a horizontal longitudinal plane.

5 Claims, 2 Drawing Sheets

LIGHTING APPARATUS HAVING MEANS FOR COMPENSATING FOR FAILURE OF LIGHTING ON A BEND

FIELD OF THE INVENTION

The present invention relates to lighting apparatus for a motor vehicle.

More particularly, the present invention relates to lighting apparatus arranged at the front of a vehicle and comprising, on either side of the longitudinal axis of the vehicle, two passing or dipped-beam headlights which produce a regulation lighting beam for a passing light, and which are adapted to pivot about a substantially vertical axis, towards a position which is deflected to the left or deflected to the right when the vehicle is in a left-hand or right-hand bend situation, respectively, and two auxiliary headlights which produce an auxiliary regulation lighting beam.

BACKGROUND OF THE INVENTION

The use of dipped-beam or passing headlights (also referred to in this Application as "passing headlights" or "passing lights"), to produce a beam for illuminating the road when negotiating a bend, enables the visibility of the driver of the vehicle to be improved when going round bends.

However, in the event of failure of such a passing light, or light adapted for illuminating on bends, in its deflected position, and in particular if it is deflected towards the left, the direction of travel of vehicles on the road being on the right, this headlight can be a major source of dazzling for drivers travelling in the opposite direction, on the left-hand lane.

DISCUSSION OF THE INVENTION

The invention aims to overcome this problem by proposing a simple, effective and inexpensive solution.

With this in view, the invention proposes a lighting apparatus of the type described above, characterised in that it further includes a central unit which, when it detects failure of a passing light in a said deflected position, causes the faulty passing light to be extinguished and at least one of the said auxiliary headlights to be lit, whereby the auxiliary headlight compensates for the extinction of the faulty passing headlight by producing a compensating lighting beam which has regard to the maximum permitted regulation photometric values above a horizontal longitudinal plane.

According to further features of the invention:
the auxiliary headlights are cruising or main-beam headlights (also referred to in this Application as "cruising headlights" or "cruising lights), which produce a regulation lighting beam for a cruising light, and, when the central unit detects failure of a passing headlight in the deflected position, it controls means which cause the form of the light beam produced by the cruising headlight which is lit to be modified, whereby its light beam has regard to the maximum permitted regulation photometric values above the horizontal longitudinal plane;
each cruising headlight includes a range corrector which is adapted to modify the inclination of the cruising beam with respect to a horizontal longitudinal plane, and, in order to form the compensating beam, the central unit controls the range corrector of the cruising headlight in such a way as to deflect its light beam downwards;
each cruising headlight includes means for forming an upper cut-off line in its light beam, and the upper cut-off line is substantially coincident with the horizontal longitudinal plane when the cruising headlight is producing the compensating beam;
each cruising headlight is of the type having an image-reproducing optic, and includes an occulting device which defines a cut-off edge defining the upper cut-off line in the light beam produced by the cruising headlight.

Further features and advantages of the invention will appear on a reading of the following detailed description of a preferred embodiment of the invention, for an understanding of which reference should be made to the accompanying drawings.

DESCRIPTION OF A PREFERRED EMBODIMENT OF THE INVENTION

Figure 1:
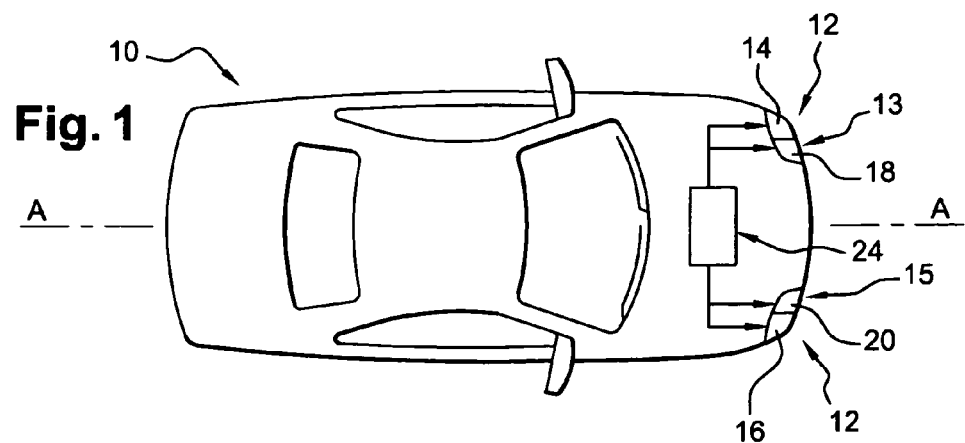
FIG. 1 is a diagram representing a vehicle equipped with lighting apparatus made in accordance with the features of the invention.

FIG. 1 shows a motor vehicle 10 which includes a lighting apparatus 12 made in accordance with the features of the invention.

In the remainder of this description, an orientation from back to front along the longitudinal axis A—A of the vehicle 10, that is to say from left to right in FIG. 1, will be used by way of example but without limitation.

The lighting apparatus 12 is arranged at the front of the vehicle 10, and comprises two lighting units, namely a left-hand lighting unit 13 and a right-hand lighting unit 15, which are arranged substantially symmetrically with respect to a vertical plane of symmetry passing through the longitudinal axis A—A.

Each lighting unit 13 or 15 comprises a dipped-beam or passing headlight 14, 16 respectively, together with a main-beam or cruising headlight 18, 20 respectively, the passing lights 14 and 16 being distinct from the cruising lights 18 and 20. All the lights are arranged behind a protective front glass 22. The left-hand light unit 13 is shown diagrammatically in FIG. 2.

In the embodiment shown here, the passing lights 14 and 16 are arranged in the respective light unit 13, 15, on the side opposite to the longitudinal axis A-A, and the cruising lights 18, 20 are arranged to one side of the longitudinal axis A—A.

The lights 14, 16, 18, 20 are constructed in known ways.

When they are lit, the passing lights 14, 16 together produce a passing beam Fc, which is a regulation lighting beam suitable for a dipped-beam lighting system.

The passing beam Fc is characterised in particular by a so-called cut-off line, that is to say a directional limit above which only a weak light intensity is emitted. This cut-off line generally consists of a horizontal half-plane, to the left of the longitudinal axis of the headlight (for driving on the right), and to the left of a half-plane which is slightly inclined upwards, on the right of the said longitudinal axis. This last half plane is raised through a "cut-off relief angle" which is, for a standard European beam, 15 degrees.

Figure 3:
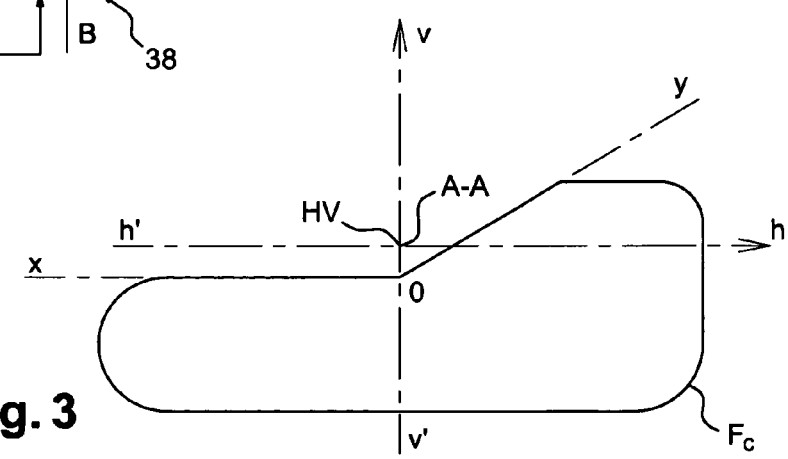
FIG. 3 is a diagram showing a regulation lighting beam of a dipped-beam or passing headlight.

The lighting produced by this beam Fc on a screen placed at about 25 metres in front of the passing lights 14 and 16 is shown in FIG. 3, the point HV being the trace of the longitudinal axis A—A of the vehicle 10, at the intersection of the vertical plane v'v and the horizontal plane h'h. The cut-off beam is defined by a half straight line Ox, which extends parallel to and below the horizontal axis h'h, from the point O towards the left, and by the half straight line Oy, inclined at 15 degrees, which extends from the point O upwards and to the right.

It will be noted that the description refers to the vehicle 10 driving on the right. For driving on the left, it is sufficient to consider the Figures that represent the screen as being reversed with respect to the axis v'v.

The passing lights 14 and 16 are arranged to pivot about a substantially vertical axis C—C, towards a position deflected to the left or deflected to the right when the vehicle 10 is in a left-hand or a right-hand bend situation respectively.

A central unit 24 is arranged to control the pivoting movement of the passing lights 14 and 16, for example as a function of the angle of deflection of the steered wheels of the vehicle 10.

Figure 4:
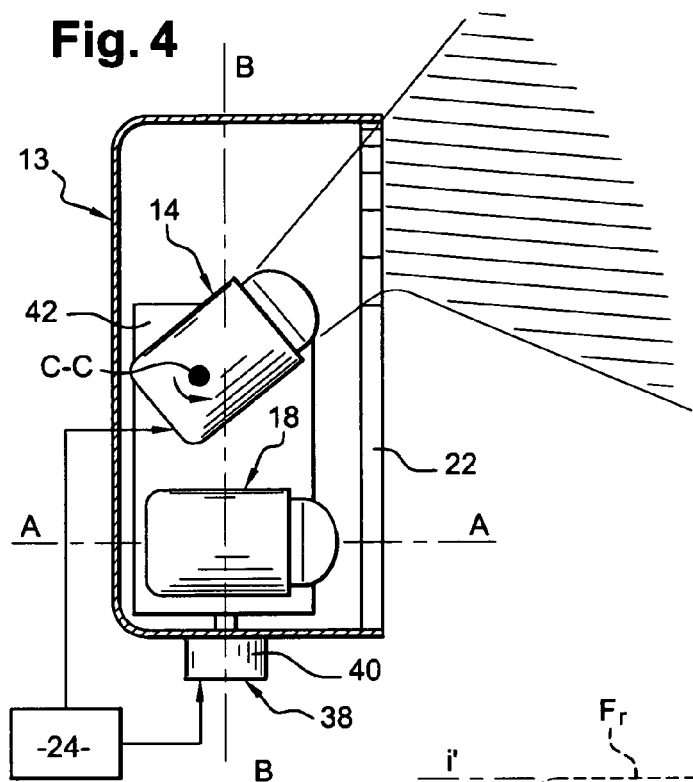
FIG. 4 is a view similar to FIG. 2, and shows the passing headlight of the left-hand lighting unit in a position deflected towards the left.

Thus, on a left-hand bend, the central unit 24 controls the pivoting movement of the passing lights 14 and 16, in the anti-clockwise direction in this case, in such a way as to illuminate the left-hand part of the roadway as is shown in FIG. 4.

When they are lit, the cruising lights 18 and 20 together produce a regulation light beam suitable for cruising lights, or main beam Fr.

Figure 5:
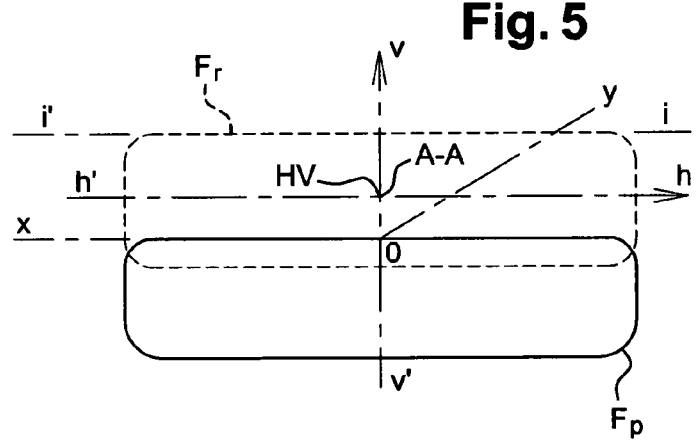
FIG. 5 is a diagram similar to FIG. 3, and shows a regulation lighting beam for a cruising or main-beam headlight, and a compensating light beam.

The main beam Fr is a light beam in which the maximum light intensity is substantially centred on the longitudinal axis A—A, as is illustrated in broken lines in FIG. 5.

Figure 6:
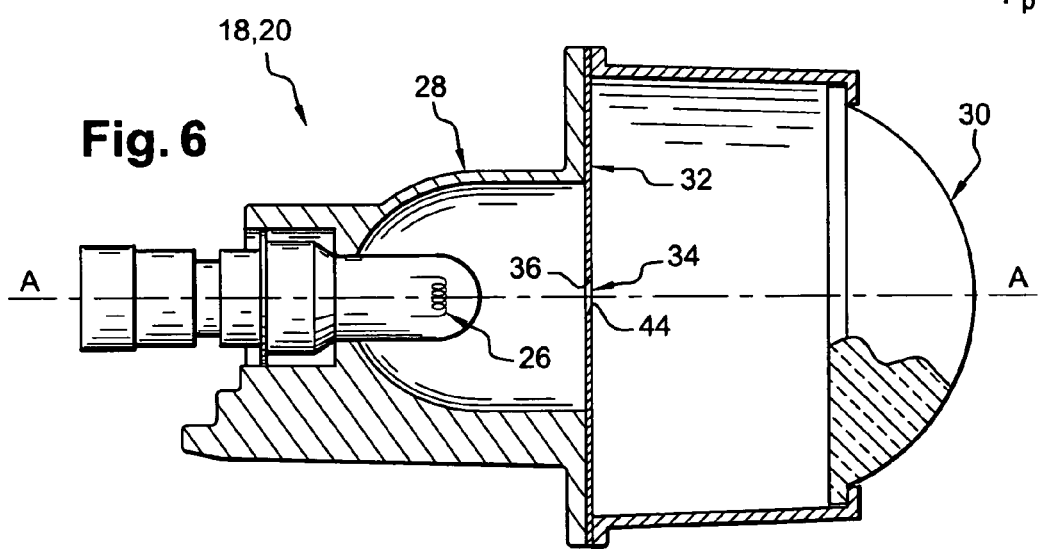
FIG. 6 is a view in axial cross section, showing diagrammatically a cruising headlight in the lighting apparatus of FIG. 1.

Preferably, the cruising lights 18 and 20 are of the type having an image-reproducing optic, also referred to as an elliptical headlight. Such a type of headlight 18, 20 is shown in FIG. 6.

Each cruising headlight 18, 20 includes a light source 26, which is located at the first focus of a reflector 28 having a substantially elliptical profile in a vertical longitudinal plane, a convergent lens 30, a focal plane of which passes in the vicinity of a second focus of the reflector 28.

The optical axis of each cruising headlight 18, 20 in this example is substantially horizontal, and it can for example be defined by the two foci of the reflector 28.

Since the optical axis is generally parallel to the longitudinal axis A—A of the vehicle 10, in the remainder of this description the reference "A—A" will be used indiscriminately for both axes.

Preferably, with a view to correcting the distribution of the light intensity in the main beam Fr, and in particular with a view to causing progressive diminution to take place in the light intensity within the lighting zone situated vertically below the optical axis A—A, which is liable to give rise to visual impairment due to an excessively high intensity of light close to the vehicle 10, each cruising headlight 18, 20 includes a mask 32.

The mask 32 is for example made in accordance with the arrangements disclosed in the document FR-A-2 811 408.

The mask 32 is interposed axially (A—A) between the reflector 28 and the lens 30, in the vicinity of the focal plane of the lens 30.

The mask 32 delimits, in the vicinity of the optical axis A—A, a window 34 in the form of a transverse slot.

The upper edge 36 of the window 34 produces, in the main beam Fr, a progressive diminution in the light intensity within the lighting zone situated vertically below the optical axis A—A.

Figure 2:
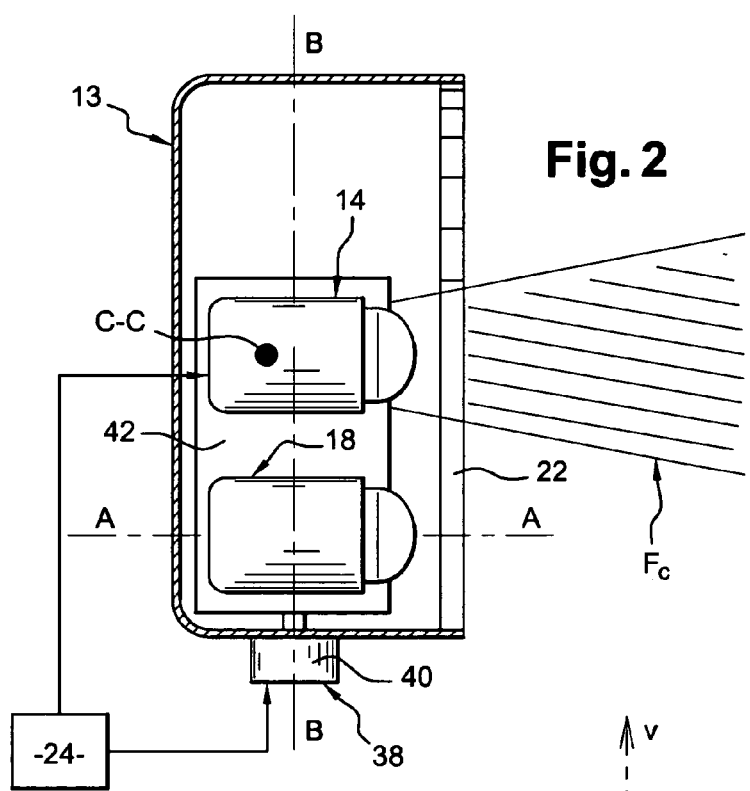
FIG. 2 is a top plan view showing diagrammatically the left-hand lighting unit of the vehicle shown in FIG. 1.

Preferably, and in accordance with the diagrammatic representation seen in FIG. 2, each lighting unit 13, 15 includes a range corrector 38 which is controlled by the central unit 24.

FIG. 2 shows diagrammatically the range corrector 38 in the form of an electric motor 40 which is arranged to produce pivoting movement, about a transverse axis B—B which is substantially horizontal and orthogonal to the longitudinal axis A—A, of a support 42 which carries the passing light 14 and the cruising light 18.

The pivoting movement of the support 42 about the transverse axis B—B is controlled by the central unit 24, in particular in such a way as to correct the range of the passing beam Fc and that of the main beam Fr, that is to say the inclination of these beams Fc and Fr with respect to a horizontal longitudinal plane, as a function of variations in the attitude of the vehicle 10. These attitude variations occur in particular while the vehicle is accelerating and during application of the brakes.

In accordance with the features of the invention, when the central unit 24 detects failure of a passing light 14 or 16 in the deflected position, it causes the faulty passing light 14 or 16 to be extinguished and at least one cruising light 18 or 20 to be lit.

The lighting up of the cruising light 18 or 20 compensates for the extinguishing of the faulty passing light 14 or 16, by producing a compensating light beam Fp.

The compensating light beam Fp must respect the maximum photometric values permitted by the regulations above a horizontal longitudinal plane. In particular, the compensating beam Fp must not dazzle drivers coming in the opposite direction, that is to say it must emit a low quantity of light above the half straight line Ox corresponding to the flat cut-off line of the passing beam Fc.

In consequence, when a passing light 14, 16 fails, the central unit 24 controls means which cause the form of the light beam produced by the cruising light 18, 20 which is lit to be modified, in such a way that its light beam has regard to the maximum photometric values permitted by regulations above the horizontal longitudinal plane.

In the embodiment shown here, the central unit 24 therefore controls the range corrector 38 in such a way that it lowers the light beam produced by the main beam headlight 18, 20 below the half straight line Ox, as shown in FIG. 5 by the compensating beam Fp. In this way a compensating beam Fp is obtained which satisfies the regulations as to photometric values.

It will be noted that the lighting apparatus 12 according to the invention has the advantage of enabling failure of a passing light 14 or 16 to be compensated for without the addition of any additional component, because the range corrector 38 is generally already present.

The compensation may be effected by lighting up a single main headlight 18, 20, or both main headlights 18 and 20.

Preferably, the lower edge 44 of the window 34 in the mask 32 defines an upper cut-off line within the light beam produced by the cruising light 18, 20, that is to say it limits the maximum value of the light intensity produced above a directional limit i'i.

The vertical position of the lower edge 44 is so chosen that, when the cruising light 18, 20 is used to give the main beam Fr, the directional limit i'i is high enough not to be seen by the driver of the vehicle 10, and is such that, when the cruising light 18, 20 is used to give the compensating beam Fp, the directional limit i'i is substantially coincident with the half straight line Ox.

Like the upper edge 36, the lower edge 44 of the mask 32 may be made in accordance with the arrangements described in the document FR-A-2 811 408, in such a way that the cut-off line formed in the light beam produced by the cruising lights 18, 20 is blurred and achromatic.

In a modified embodiment (not shown) of the invention, the cruising lights 18, 20 may be of the complex surface type, that is to say each of them comprises a reflector, a light source constituted by a filament, and a protective cover glass, the reflective surface being calculated in such a way as to form a main beam directed forward. In that case, the reflective surface of the reflector is calculated in such a way as to locate the small and large images of the filament precisely with respect to the directional limit i'i, whereby to obtain a compensating beam Fp which satisfies the regulations as to photometric values.

In a further modified embodiment (not shown) of the invention, the compensating beam Fp may be produced by a further, auxiliary, headlight, for example a foglight.

What is claimed is:

1. A lighting apparatus arranged at the front of a vehicle having a longitudinal axis and comprising,
   (a) two passing headlights, which when lit, each produce a passing light regulation light beam having maximum permitted photometric values above a horizontal longitudinal plane, each of the passing headlights is disposed on opposite sides of the longitudinal axis of the vehicle and is adapted to pivot about a substantially vertical axis, towards a position which is deflected to the left and a position which is deflected to the right when the vehicle is in a left-hand and a right-hand bend situation, respectively,
   (b) two auxiliary headlights, which when lit, each produce an auxiliary regulation light beam, and
   (c) a central unit which, upon detecting failure of a passing headlight in a deflected position, causes the faulty passing headlight to be extinguished and at least one of the auxiliary headlights to be lit, whereby the auxiliary headlight compensates for the extinction of the faulty passing headlight by producing a compensating light beam which conforms to the passing light beam maximum permitted regulation photometric values above the horizontal longitudinal plane.

2. The lighting apparatus according to claim 1, wherein the auxiliary headlights are cruising headlights which normally produce a regulation light beam for a cruising light, and wherein, when the central unit detects failure of the passing headlight in the deflected position, the cruising headlight light beam is modified to conform to the passing light beam maximum permitted regulation photometric values above the horizontal longitudinal plane.

3. The lighting apparatus according to claim 2, wherein each cruising headlight includes a range corrector which is adapted to modify the inclination of the cruising beam with respect to a horizontal longitudinal plane, and wherein, in order to form the compensating beam, the central unit controls the range corrector of the cruising headlight in such a way as to deflect the cruising beam downwards.

4. The lighting apparatus according to claim 2, wherein each cruising headlight has an upper cut-off line in the cruising beam, and wherein the upper cut-off line is substantially coincident with the horizontal longitudinal plane when the cruising headlight produces the compensating beam.

5. The lighting apparatus according to claim 4, wherein each cruising headlight has an image-reproducing optic, and includes an occulting device which defines a cut-off edge defining the upper cut-off line in the light beam produced by the cruising headlight.

* * * * *